Aug. 16, 1955
G. W. SCHROEDER
2,715,673
PRESSURE COOKING APPARATUS
Filed Dec. 24, 1953
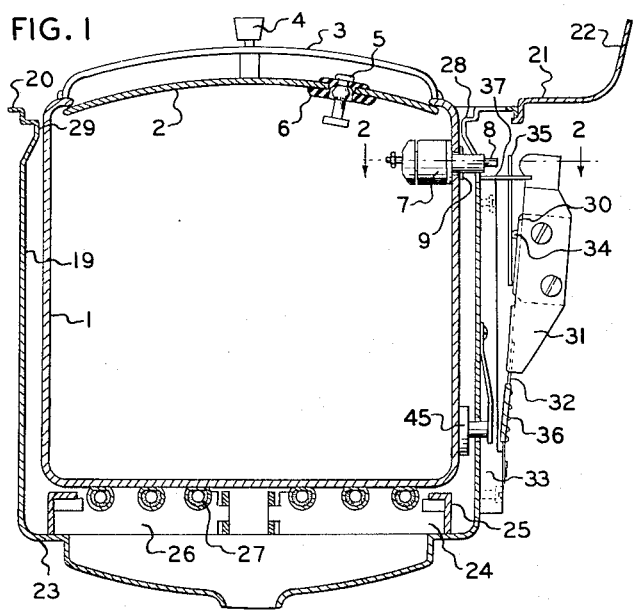
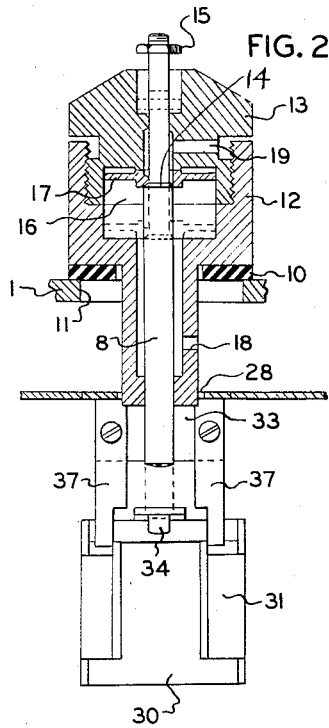
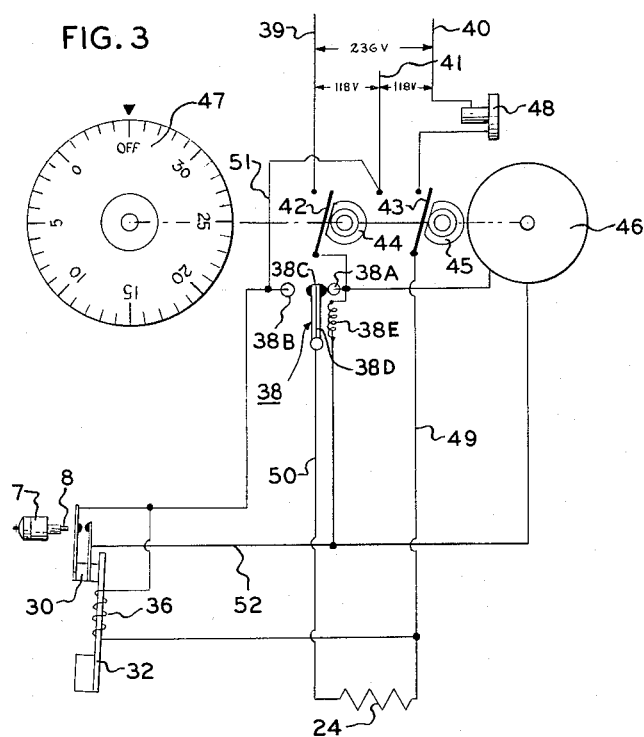
*INVENTOR.*
GEORGE W. SCHROEDER
BY
*Sheridan W. Biggs*
HIS ATTORNEY

2,715,673

PRESSURE COOKING APPARATUS

George W. Schroeder, Louisville, Ky., assignor to General Electric Company, a corporation of New York Application December 24, 1953, Serial No. 400,279

6 Claims. (Cl. 219—43)

My invention relates to pressure cooking apparatus, and more particularly to means for automatically controlling the operation of such apparatus.

One of the objects of my invention is to provide pressure cooking apparatus having improved means for automatically regulating the heating of the cooking vessel, maintaining the desired cooking pressure for a predetermined cooking period, and venting the cooking vessel at the end of the cooking operation.

Another object of my invention is to provide automatic pressure cooking apparatus which may be conveniently mounted in the body of an electric range.

Another object of my invention is to provide automatic pressure cooking apparatus including a cooking vessel adapted to rest in a receptacle supported below the cooking top of an electric range and heat control means in the range engageable with the vessel and responsive to the pressure therein.

Further objects and advantages of my invention will become apparent as the following description proceeds, and the features of novelty which characterize my invention will be pointed out with particularity in the claims annexed to and forming a part of this specification.

Briefly stated, in accordance with one aspect of my invention I provide a pressure cooking vessel having a pressure valve in one wall thereof, and a heating unit for the vessel connected in a control circuit including a time switch and a pressure controlling device mounted for movement into and out of engagement with the pressure valve. Preferably the heating unit is mounted at the bottom of a receptacle suspended in the cooking top of an electric range, and the pressure controlling device is mounted on the receptacle so that it may be moved into engagement with the pressure valve when the vessel rests on the heating unit. During operation the pressure controlling device reduces the heat output of the heating unit when the pressure in the vessel approaches the desired cooking pressure and retracts out of engagement with the pressure valve to permit venting of the vessel at the end of the cooking operation.

For a better understanding of my invention reference may be made to the accompanying drawing in which:

Fig. 1 is a sectional view showing presure cooking apparatus constructed in accordance with my invention.

Fig. 2 is a sectional view taken along the line 2—2 of Fig. 1.

Fig. 3 is a diagrammatic view showing the elements and arrangement of the control circuit for the apparatus shown in Fig. 1.

Referring to the drawing, the numeral 1 designates a pressure cooking vessel having an open top which may be closed and sealed by a cover 2, the sealing mechanism including a support 3 and a handle or knob 4. Cover sealing mechanisms for pressure vessels are well known in the art and since the manner in which the cover is sealed does not form a part of the present invention, further description of the sealing mechanism is believed to be unnecessary. Mounted in the cover 2 is an air exhaust and safety valve 5 supported in a rubber grommet 6. The valve 5 functions to first permit the escape of air during initial heating of the vessel and finally as the pressure begins to rise, to seal the vessel, and thereafter act as a safety valve which will blow out of cover 2 should the pressure in vessel 1 rise above the normal operating range.

Mounted in the side wall of vessel 1 is a pressure valve 7 having a movable projecting element or valve stem 8 which is movable from the position shown in solid lines in Fig. 2 to the position shown in dotted lines in response to a predetermined increase in pressure within the cooker. Valve stem 8 is also movable to a third more extended position to vent the cooker as will be hereinafter explained. Valve 7 is supported in pressure tight relation in the side wall of vessel 1 by any suitable means such as ears 9 which compress gasket 10 when they engage the outer surface of the vessel after the valve is placed in opening 11 and rotated ninety degrees.

Referring to Fig. 2, presure valve 7 comprises a body 12 including an internally threaded portion adapted to receive the threaded end portion of cap 13, both body 12 and cap 13 having axially aligned openings to receive valve stem 8. Valve stem 8 includes a shoulder 14 which tapers abruptly from the larger end of the stem to the smaller end on which is secured a stop nut 15. Coaxial with valve stem 8 and positioned in valve chamber 16 is a valve disk 17 which is free to move axially with respect to the valve stem. Because a vent opening 18 is provided in valve body 12 the lower side of valve disk 16 (as viewed in Fig. 2) is exposed to atmospheric pressure, while the upper surface of disk 17, or at least the central portion thereof resting on shoulder 14, is exposed to pressure in vessel 1 because the radial passage 19 in cap 13 provides communication between the exterior of the cap and the annular passage surrounding valve stem 8.

In operation, valve stem 8 is biased by means hereinafter described to the position shown in solid lines in Fig. 2 until the pressure within vessel 1 rises sufficiently to overcome the biasing force and move valve stem 8 and disk 17 to the position shown in dotted lines. It will be observed that when the predetermined pressure sufficient to overcome the biasing force is reached, valve stem 8 shifts rapidly to the position shown in dotted lines because the pressure initially acts only on an area equal to the cross sectional area of the larger portion of stem 8, and is transferred to the entire upper surface of disk 17 as soon as the disk and valve stem begin to move. When the valve stem 8 and disk 17 reach the dotted line position shown in Fig. 2 the disk seats on the chamber wall and seals the annular opening around valve stem 8, the stem being restrained from moving further as will be hereinafter explained. At the end of the cooking operation this restraint on valve stem 8 is removed and it moves outwardly to a third position limited by the engagement of nut 15 with cap 13, in which position pressure in the cooker escapes between shoulder 14 and the central portion of disk 17, passing out through opening 18 in body 12.

In the preferred embodiment of my invention pressure cooking vessel 1 is supported on and heated by a deep well cooking unit mounted in the cooking top of an electric range. As shown in Fig. 1 the deep well heating unit preferably comprises a generally cylindrical receptacle 19 having an outwardly extending flange or ring 20 disposed about the top thereof and arranged to support the receptacle in an aperture in the cooking top 21. Customarily the aperture in which the deep well heating unit is supported is located near the backsplasher 22 at the rear of the cooking top. At the bottom of receptacle 19 suitable means such as inturned flange 23 are provided to support a surface heating unit 24. As illustrated in the drawing, surface heating unit 24 may comprise a support ring 25, a plurality of radial arms forming a supporting spider 26 and a coiled sheath-type heating element 27 resting on the spider. To accommodate the portion of pressure valve 7 which projects beyond the side wall of vessel 1, a slot 28 is provided in the upper edge of receptacle 19 and flange 20; the width of slot 28 is only slightly greater than the diameter of the projecting portion of valve 7 so that vessel 1 can be placed in receptacle 19 and seated on heating unit 24 only when valve 7 is aligned with slot 28. To further insure the proper location of pressure valve 7 with respect to certain control system elements hereinafter described, receptacle 19 includes means for centering vessel 1, such as inwardly extending annular portion 29 adjacent the top of receptacle 19.

Cooperating with valve stem 8 when vessel 1 is supported in receptacle 19 is a control switch 30 mounted adjacent the outer surface of receptacle 19 for movement between a first position relatively close to the receptacle, which may be referred to as its forward position, and a second position more remote therefrom, which may be referred to as its retracted position. Switch 30 is mounted in a generally channel shaped bracket 31 which in turn is mounted on the free end of a bimetallic arm 32. The other end of bimetallic arm 32 is fixedly secured to receptacle 19 and is preferably insulated therefrom to minimize transmission of heat from receptacle 19 thereto. Thus as shown in Fig. 1 a generally rectangular block 33 of insulating material is secured by suitable fastening means to receptacle 19 and the lower end of arm 32 is secured to block 33. Switch 30 is of the type having a pair of normally open contacts which are closed by pressure on a plunger 34, such as a micro switch, and includes an operating lever 35 secured to the switch casing and projecting into the path of travel of valve stem 8. Bimetallic arm 32 and switch 30 are moved from the retracted position shown in Fig. 1 to the forward position relatively close to receptacle 19 when arm 32 is heated by a suitable heating element such as a coiled heating element 36. In the latter position operating lever 35 engages stem 8 and biases it to the position shown in solid lines in Fig. 2. Inasmuch as the proper operation of my pressure cooking apparatus depends on the relative positions of operating lever 35 and valve stem 8, it is necessary to limit the movement of arm 32 and switch 30 toward receptacle 19 and therefore I provide a pair of stop members 37 secured to the receptacle and engageable with bracket 31 to positively determine the forward position of switch 30. Stop members 37 are also arranged to guide bracket 31 and maintain lever 35 in alignment with stem 8. During a cooking operation valve stem 8 actuates the contacts of switch 30 to the closed position when the pressure in vessel 1 is sufficient to overcome the biasing force exerted by operating lever 35. Furthermore if the pressure in vessel 1 exceeds a predetermined maximum it exerts a force on valve stem 8 sufficient to move it outwardly from vessel 1 to a third position limited by the engagement of nut 15 with cap 13, in which position steam is allowed to escape between shoulder 14 on the valve stem and the central portion of disk 17. At the end of the cooking operation heating element 36 is deenergized as hereinafter explained, thus permitting switch 30 to move away from receptacle 19 to the position shown in Fig. 1, and valve stem 8 is permitted to override disk 17 in which position steam continuously escapes between shoulder 14 and the central portion of disk 17 until the pressure in vessel 1 reaches atmospheric pressure.

Referring now to Fig. 3, heating unit 24 is connected in series with a relay 38 normally connecting the heating unit to the outer conductors 39, 40 of a three conductor source of electrical energy, but operable when energized to connect the heating unit to outer conductor 40 and neutral conductor 41. Preferably relay 38 is of the heated bimetal type and comprises fixed contacts 38a and 38b, a movable contact 38c mounted on a bimetal arm 38d, and a heater 38e for moving contact 38c out of engagement with contact 38a and into engagement with contact 38b. However any relay suitable for switching heating unit 24 from a relatively high to a relatively low voltage or vice versa may be utilized. The energization of heating unit 24 is controlled by time switch means adapted to be manually set to connect the heating unit to the energy source. In the embodiment disclosed herein, the time switch means include switch contact 42, connecting conductor 39 and contact 38a of relay 38, switch contact 43 connecting conductor 40 and one terminal of heating unit 24, cams 44 and 45 for actuating contacts 42 and 43 respectively, timer motor 46 for rotating cams 44 and 45, and a manually operable control knob 47. As diagrammatically illustrated in Fig. 3, cams 44 and 45, motor 46, and knob 47 are all mounted on a common shaft which may be rotated by motor 46 or by knob 47. These elements may be mounted in any convenient location in the range affording easy access to knob 47; for example, the switch elements and timer motor may be mounted behind backsplasher 22 with one end of the common shaft extending therethrough and supporting knob 47. To protect the apparatus against overheating, as when the water in vessel 1 is completely evaporated for example, a suitable overheat thermostat 48 may be connected in the power supply circuit as shown.

The heating circuit may be traced from conductor 40 to overheat thermostat 48, through time switch contact 43, conductor 49, heating unit 24, conductor 50, contacts 38c and 38a of relay 38, contact 42 and supply conductor 39. Energization of relay 38 modifies this heating circuit by moving contact 38c into engagement with contact 38b which is connected to the neutral conductor 41 through conductor 51. Thus when relay 38 is in the position shown in the drawing, heating unit 24 is energized at a relatively high voltage, for example 236 volts, and thus produces a relatively high heat output. When relay 38 is energized, heating unit 24 is switched to a relative lower voltage, for example 118 volts, and consequently produces a relatively lower heat output. It will be observed that heater 36 associated with bimetallic arm 32 is connected across wires 49 and 51, and hence is energized concurrently with heating unit 24 regardless of the position of relay 38.

Timer motor 46 and heater 38e of relay 38 are connected in parallel circuit relation and are arranged to be simultaneously energized by the closing of the contacts of switch 30 when contacts 42, 43 of the time switch are also closed. Thus the control circuit of my pressure cooking apparatus may be traced from conductor 39 through contact 42 to heater 38e of relay 38 and timer motor 46 in parallel therewith, thence to the contacts of switch 30 through conductor 52, and finally through conductor 51 to neutral conductor 41.

In describing the operation of my invention it will first be assumed that water and the food to be cooked have been placed in vessel 1, the cover installed and sealed, and the vessel placed in receptacle 19 in the position shown in Fig. 1. Next control knob 47 is rotated to a setting corresponding to the number of minutes required to cook the food at the pressure maintained in vessel 1, which preferably is approximately 15 lbs. per square inch. After these operations have been performed by the housewife, no further attention on her part is required and the cooking operation is completed automatically, terminating with the venting of the vessel so that the cover may be safely unsealed and removed to permit removal of the food.

Rotation of control knob 47 to any position on the numbered scale closes contacts 42 and 43, thus energizing heating unit 24 at 236 volts since relay 38 is initially in the position shown in Fig. 3. As the water in vessel 1 is brought to a boil steam drives the air in the vessel out through the automatic air exhaust and safety valve 5 until the pressure of the steam is sufficient to lift and close the valve. Closure of contacts 42 and 43 also effects the energization of heating element 36, thus causing bimetallic arm 32 and switch 30 to move to the forward position in which operating lever 35 engages valve stem 8. However the alignment of operating lever 35 is such that the contacts of switch 30 are not closed at this time, and remain open until valve stem 8 moves outwardly to the position shown in dotted lines in Fig. 2.

In accordance with my invention heating unit 24 is energized at substantially its full wattage until the desired cooking pressure is reached at which time the heat output of the heating unit is reduced and the timed cooking period is started. These changes are effected when the pressure in vessel 1 overcomes the biasing force exerted by operating lever 35 on valve stem 8 and forces the valve stem to the position shown in dotted lines in Fig. 2, thus closing the contacts of switch 30. The pressure at which this movement takes place depends of course on the resilience of operating lever 35, and is preferably somewhat below the desired cooking pressure to minimize the "overshoot" of temperature and pressure which might otherwise occur. For example operating lever 35 may be constructed and arranged so as to exert a biasing force which is overcome by a pressure of twelve pounds per square inch in vessel 1 if the apparatus is designed for a normal cooking of fifteen pounds per square inch. As heretofore explained pressure valve 7 is arranged so that valve stem 8 overrides disk 17 and permits steam to escape from vessel 1 if the desired cooking pressure is exceeded; thus operating lever 35 is designed so that its resilience is such that it prevents movement of valve stem 8 to its venting position unless the pressure in vessel 1 exceeds the predetermined cooking pressure.

In normal operation, the closing of the contacts of switch 30 as the pressure in vessel 1 reaches twelve pounds per square inch energizes relay 38 and timer motor 46. Thus contact 38c is moved from contact 38a into engagement with 38b, reducing the voltage applied to heating unit 24, and the timed cooking period is begun. When timer motor 46 has driven control knob 47 and cams 44 and 45 to the off position shown in Fig. 3, contacts 42 and 43 are opened thus deenergizing heating unit 24 and heating element 36. Bimetallic arm 32 quickly cools thus retracting switch 30 to the retracted position and disengaging operating lever 35 from valve stem 8. Valve stem 8 is then free to override disk 17 in pressure valve 7 and the steam in vessel 1 is vented through opening 18 in valve body 12. Thus when the cooking operation is completed the pressure cooking apparatus is completely deenergized, the pressure in vessel 1 is reduced to atmospheric pressure, and the position of air exhaust valve 5 indicates when it is safe to remove cover 2.

From the foregoing description it will be evident that pressure valve 7 cooperates with switch 30 and the other elements of the apparatus to effect rapid initial heating of the pressure cooking vessel, and to maintain the predetermined cooking pressure by venting the vessel if the pressure increases abnormally and by energizing the heating unit at full wattage if the pressure should drop below the desired cooking pressure. The operation of the apparatus is completely automatic, may be installed in the deep well heating unit of an electric range, and is relatively simple and economical to manufacture.

While I have shown and described a specific embodiment of my invention, I do not desire my invention to be limited to the particular construction shown and described and I intend by the appended claims to cover all modifications within the true spirit and scope of my invention.

What I claim as new and desire to secure by Letters Patent of the United States is:

1. In an automatic pressure cooker including a pressure valve in one wall thereof having a movable projecting element movable from a first position to a second position in response to a predetermined increase in pressure within the cooker and also movable from said second position to a third position to vent the cooker, the combination comprising electric heating means for heating said cooker, manually operable means for connecting said heating means to a source of electrical energy, timer means for disconnecting said heating means from said energy source at the end of a predetermined period of time, means in circuit with said heating means for reducing the heat output of said heating means from a first value to a second relatively lower value, a control circuit including a pair of normally open switch contacts movably supported adjacent said pressure valve for operating said last named means and initiating the operation of said timer means, means concurrently energized with said heating means for moving and holding said switch contacts in operative association with said projecting element of said valve, said projecting element and said switch contacts being so arranged that movement of said projecting element from said first to said second position closes said contacts and movement of said contacts out of operative association with said projecting element permits said projecting element to move from said second to said third position.

2. In an automatic pressure cooker including a pressure valve in one wall thereof having a movable projecting element movable from a first position to a second position in response to a predetermined increase in pressure within the cooker and also movable from said second position to a third position to vent the cooker, the combination comprising electric heating means for heating said cooker, manually operable means for connecting said heating means to a source of electrical energy and for setting the time duration of a desired pressure cooking operation, timer means for disconnecting said heating means from said energy source at the end of a period of time determined by the setting of said manually operable means, a relay in circuit with said heating means operable to reduce the current in said heating means and thus the heat output thereof from a first value to a second relatively lower value in response to a predetermined pressure in said cooker, a control circuit including a pair of normally open switch contacts movably supported adjacent said pressure valve for operating said relay and initiating the operation of said timer means, means concurrently energized with said heating means for moving and holding said switch contacts in operative association with said projecting element of said valve, said projecting element and said switch contacts being so arranged that movement of said projecting element from said first to said second position closes said contacts and movement of said contacts out of operative association with said projecting element permits said projecting element to move from said second to said third position.

3. In an automatic pressure cooker including a pressure valve in one wall thereof having a movable projecting element movable from a first position to a second position in response to a predetermined increase in pressure within the cooker and also movable from said second to a third position to vent the cooker, the combination comprising electric heating means for heating said cooker, manually operable means for connecting said heating means to a source of electrical energy and for setting the time duration of a desired pressure cooking operation, timer means for disconnecting said heating means from said energy source at the end of said cooking operation, a relay in circuit with said heating means operable to reduce the current in said heating means and thus the heat output thereof from a first value to a second relatively lower value in response to a predetermined pressure in said cooker, a control circuit including a switch having a pair of normally open contacts for operating said relay and initiating the operation of said timer means, said switch being movably supported adjacent said pressure valve, a bimetallic member associated with said switch and arranged to move and hold said switch in operative association with said projecting element of said valve when heated by a heater concurrently energized with said heating means, said projecting element and said switch being so arranged that movement of said projecting element from said first to said second position closes the contacts of said switch and movement of said switch out of operative association with said projecting element permits said projecting element to move from said second to said third position.

4. Pressure cooking apparatus comprising a receptacle adapted to be supported in an opening in the cooking top of an electric range, means disposed about the top of said receptacle for engaging said cooking top and supporting said receptacle in said opening, a horizontally disposed electric heating unit in the bottom of said receptacle, a pressure vessel adapted to be supported in said receptacle in heat transfer relation with said heating unit, a switch mounted adjacent the outer surface of said receptacle for movement between a first position relatively close to said receptacle and a second position more remote therefrom, means responsive to the flow of current in said heating unit for moving said switch from said second to said first position, said switch including a pair of contacts normally biased to open position and an operating lever for closing said contacts, a manually rotatable control knob adapted for movement between an "off" position and a time indicating position, cam means arranged for rotary movement with said knob, an electric timer motor arranged to drive said cam means and knob from said time indicating position to said "off" position, a three conductor source of electrical energy, cam operated switching means arranged to be actuated by said cam means to connect said heating unit to said energy source, a current responsive relay in series with said heating unit arranged to selectively connect said heating unit to the outer conductors of said source to provide high heat output or to an outer conductor and the neutral conductor of said source to provide a relatively lower heat output, said relay and said timer motor being connected in circuit with and controlled by said pair of contacts in said switch whereby said timer motor is energized and said relay operates to switch said heating unit from high to relatively low heat output when a predetermined force is exerted on said operating lever, a pressure valve in said vessel including a movable plunger projecting therefrom through an opening in the side wall of said receptacle adjacent said operating lever and movable from a retracted position to an intermediate position in response to a predetermined increase in pressure within the vessel and to an extended position to vent the vessel, said plunger being in engagement with said lever when said switch is moved into its position closest to said vessel during heating operations, whereby said plunger applies said predetermined force to said operating lever upon a predetermined pressure rise in said vessel, and said lever is retracted and disengaged from said plunger so as to permit venting of said vessel when said heating unit is deenergized by said switching means upon rotation of said control knob to the "off" position by said timer motor at the end of the cooking operation.

5. Pressure cooking apparatus comprising a receptacle adapted to be supported in an opening in the cooking top of an electric range, means disposed about the top of said receptacle for engaging said cooking top and supporting said receptacle in said opening, a horizontally disposed electric heating unit in the bottom of said receptacle, a pressure vessel adapted to be supported in said receptacle in heat transfer relation with said heating unit, a bimetallic arm generally parallel to a side wall of said receptacle and secured at one end to the outer surface thereof, an electric heating element connected in parallel circuit relation with said heating unit and associated with said arm so as to supply heat thereto for moving said arm toward said receptacle, a switch mounted on the free end of said arm, said switch including a pair of contacts normally biased to open position and an operating lever for closing said contacts, stop means associated with said arm and adapted to limit movement of said arm and switch toward said receptacle, a manually rotatable control knob adapted for movement between an "off" position and a time indicating position, cam means arranged for rotary movement with said knob, an electric timer motor arranged to drive said cam means and knob from said time indicating position to said "off" position, a three conductor source of electrical energy, cam operated switching means arranged to be actuated by said cam means to connect said heating unit to said energy source, a current responsive relay in series with said heating unit arranged to selectively connect said heating unit to the outer conductors of said source to provide high heat output or to an outer conductor and the neutral conductor of said source to provide a relatively lower heat output, said relay and said timer motor being connected in circuit with and controlled by said pair of contacts in said switch whereby said timer motor is energized and said relay operates to switch said heating unit from high to relatively low heat output when a predetermined force is exerted on said operating lever, a pressure valve in said vessel including a movable plunger projecting therefrom through an opening in the side wall of said receptacle adjacent said operating lever and movable from a retracted position to an intermediate position in response to a predetermined increase in pressure within the vessel and to an extended position to vent the vessel, said plunger being in engagement with said lever when said switch is moved into its position closest to said vessel during heating operations, whereby said plunger applies said predetermined force to said operating lever upon a predetermined pressure rise in said vessel, and said lever is retracted and disengaged from said plunger so as to permit venting of said vessel when said heating unit is de-energized by said switching means upon rotation of said control knob to the "off" position by said timer motor at the end of the cooking operation.

6. Pressure cooking apparatus comprising a receptacle adapted to be supported in an opening in the cooking top of an electric range, means including a ring disposed about the top of said receptacle for engaging said cooking top and supporting said receptacle in said opening, a horizontally disposed electric heating unit in the bottom of said receptacle, a pressure vessel adapted to be supported in said receptacle in heat transfer relation with said heating unit, a bimetallic arm generally parallel to a side wall of said receptacle and secured at one end to the outer surface thereof, an electric heating element connected in parallel circuit relation with said heating unit and associated with said arm so as to supply heat thereto for moving said arm toward said receptacle, a switch mounted on the free end of said arm, said switch including a pair of contacts normally biased to open position and an operating lever for closing said contacts, a stop member secured to said receptacle and arranged to limit movement of said arm and switch toward said receptacle, a manually rotatable control knob adapted for movement between an "off" position and a time indicating position, cam means arranged for rotary movement with knob, an electric timer motor arranged to drive said cam means and knob from said time indicating position to said "off" position, a three conductor source of electrical energy, cam operated switching means arranged to be actuated by said cam means to connect said heating unit to said energy source, a bimetallic relay in series with said heating unit normally connecting said heating unit to the outer conductors of said source to provide high heat output but operable when energized to connect said heating unit to an outer conductor and the neutral conductor of said source to provide a relatively lower heat output, said relay and said timer motor being connected in circuit with and controlled by said pair of contacts in said switch whereby said timer motor is energized and said relay operates to switch said heating unit from high to relatively low heat output when a predetermined force is exerted on said operating lever, a pressure valve in said vessel including a movable plunger projecting therefrom through opening in the side wall of said receptacle adjacent said operating lever and movable from a retracted position to an intermediate position in response to a predetermined increase in pressure within the vessel and to an extended position to vent the vessel, said plunger being in engagement with said lever when said switch is moved into its position closest to said vessel during heating operations, whereby said plunger applies said predetermined force to said operating lever upon a predetermined pressure rise in said vessel, and said lever is retracted and disengaged from said plunger so as to permit venting of said vessel when said heating unit is de-energized by said switching means upon rotation of said control knob to the "off" position by said timer motor at the end of the cooking operation.

References Cited in the file of this patent
UNITED STATES PATENTS

| | | |
|---|---|---|
| 2,308,603 | Graham | Jan. 19, 1943 |
| 2,369,932 | Allen | Feb. 20, 1945 |
| 2,422,974 | Newell | June 24, 1947 |
| 2,472,451 | Whitney | June 7, 1949 |
| 2,515,879 | Korn | July 18, 1950 |
| 2,641,680 | Turner | June 9, 1953 |